US006994203B2

(12) United States Patent
Zoladz, JR. et al.

(10) Patent No.: US 6,994,203 B2
(45) Date of Patent: Feb. 7, 2006

(54) DOCUMENT VALIDATOR SUBASSEMBLY

(75) Inventors: Edward M. Zoladz, JR., West Chester, PA (US); Josef Huettner, Regensburg (DE); Mario Wanninger, Sunching (DE); Markus Zeiler, Nittendorf (DE); Ulrich Steegmueller, Regensburg (DE)

(73) Assignee: Mars Incorporated, McLean, VA (US)

( * ) Notice: Subject to any disclaimer, the term of this patent is extended or adjusted under 35 U.S.C. 154(b) by 376 days.

(21) Appl. No.: 10/211,009

(22) Filed: Aug. 2, 2002

(65) Prior Publication Data

US 2003/0081197 A1 May 1, 2003

Related U.S. Application Data

(60) Provisional application No. 60/310,334, filed on Aug. 6, 2001.

(51) Int. Cl.
*G06K 9/00* (2006.01)

(52) U.S. Cl. .................................................... 194/302

(58) Field of Classification Search ................. 194/302, 194/205, 206, 207; 356/71; 382/135, 140; 362/551, 583, 558; 385/129, 130, 131; 250/548, 250/556, 559.01, 559.04, 559.19
See application file for complete search history.

(56) References Cited

U.S. PATENT DOCUMENTS

| | | | | | |
|---|---|---|---|---|---|
| 5,467,208 | A | * | 11/1995 | Kokawa et al. | 349/67 |
| 5,499,112 | A | * | 3/1996 | Kawai et al. | 358/475 |
| 5,574,272 | A | | 11/1996 | Seo et al. | 235/454 |
| 5,586,212 | A | | 12/1996 | McConica et al. | 385/146 |
| 5,756,981 | A | | 5/1998 | Roustaei et al. | 235/462 |
| 5,786,582 | A | | 7/1998 | Roustaei et al. | 235/462 |
| 5,797,668 | A | * | 8/1998 | Kojima et al. | 362/31 |
| 5,905,583 | A | * | 5/1999 | Kawai et al. | 358/484 |
| 5,917,664 | A | * | 6/1999 | O'Neill et al. | 359/831 |
| 5,923,413 | A | | 7/1999 | Laskowski | 356/71 |
| 5,944,405 | A | * | 8/1999 | Takeuchi et al. | 362/31 |
| 5,992,749 | A | | 11/1999 | Seo | 235/472 |
| 6,061,121 | A | | 5/2000 | Holl et al. | 356/71 |
| 6,130,730 | A | | 10/2000 | Jannson et al. | 349/65 |
| 6,152,570 | A | | 11/2000 | Yokoyama | |
| 6,186,649 | B1 | | 2/2001 | Zou et al. | 362/347 |
| 6,204,938 | B1 | | 3/2001 | Horiuchi et al. | 358/484 |
| 6,211,930 | B1 | | 4/2001 | Sautter et al. | 349/66 |
| 6,347,873 | B1 | * | 2/2002 | Hosseini et al. | 362/31 |
| 6,356,389 | B1 | * | 3/2002 | Nilsen et al. | 359/625 |
| 6,386,721 | B1 | * | 5/2002 | Hosseini et al. | 362/31 |
| 6,481,864 | B2 | * | 11/2002 | Hosseini et al. | 362/31 |
| 6,570,710 | B1 | * | 5/2003 | Nilsen et al. | 359/625 |
| 2002/0015145 | A1 | | 2/2002 | Numata | 356/71 |

FOREIGN PATENT DOCUMENTS

| | | | |
|---|---|---|---|
| EP | 0317250 | | 5/1989 |
| EP | 1 164 553 | A2 | 12/2001 |
| EP | 1 180 641 | A1 | 2/2002 |
| JP | 7-261122 | | 10/1995 |
| WO | WO 01/65469 | A1 | 9/2001 |
| WO | WO 02/17217 | A1 | 2/2002 |

* cited by examiner

*Primary Examiner*—Donald P. Walsh
*Assistant Examiner*—Mark J. Beauchaine
(74) *Attorney, Agent, or Firm*—Fish & Richardson P.C.

(57) ABSTRACT

A subassembly for a document validator. In an implementation, the subassembly includes a housing, a light pipe core seated in the housing, a light control layer and at least one light source. The apparatus may also include a prism structure layer between a top diffusing surface and the light control structure. The housing may also include at least one input light port on at least one end of the light pipe core.

39 Claims, 15 Drawing Sheets

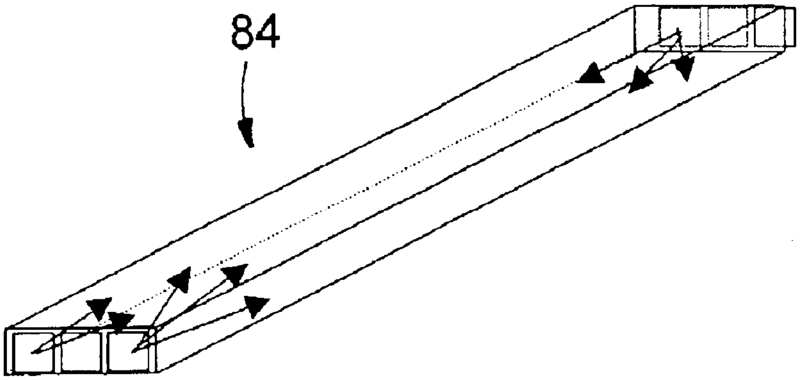
FIG. 11
FIG. 12A
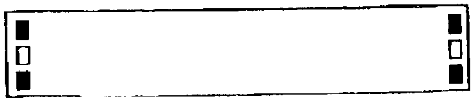
FIG. 12B
FIG. 12C

DOCUMENT VALIDATOR SUBASSEMBLY

This application claims priority from U.S. provisional application Ser. No. 60/310,334 filed on Aug. 6, 2001.

BACKGROUND OF THE INVENTION

The invention pertains to a compact document validator subassembly that illuminates documents with a constant irradiance level of light even through the distance between the light source and the documents vary from one document to another.

In the field of bill validation, for example, validators used in vending machines and the like typically utilize optical, magnetic and other sensors to obtain data from an inserted bill. In some units, a plurality of light-emitting diode (LED) light sources and phototransistor receivers are positioned on opposite sides of a bill passageway, and generate a plurality of signals corresponding to the light transmitted through the bill as a bill moves past. The signals are processed to determine certain information, such as the position of the bill in the passageway and the authenticity of the bill. The signals are typically compared to predetermined measurements stored in memory that correspond to genuine bills.

Conventional bill validation systems utilizing LED light sources also use lenses to focus the light in order to meet system performance requirements. However, some configurations do not provide sufficient light signal intensity levels to accurately validate documents. Other designs utilize high power light sources and focusing elements and are thus costly to manufacture. In addition, because the bill passageway is generally designed to be large enough to avoid bill jams, sensor measurements are sometimes adversely effected because the sensed signal varies depending upon the distance of a bill from the light source.

SUMMARY OF THE INVENTION

Presented is a subassembly for a document validator. The subassembly includes a housing, a light pipe core having a top diffusing surface, a light control layer associated with the top diffusing surface, and at least one light source.

Other implementations according to the invention may include one or more of the following features. The light control layer may be a light control film. The subassembly may include a prism structure layer between the top diffusing surface and the light control film, and the prism structure layer may be a brightness enhancing film. The diffusing surface may include at least one of a random rough structure, a constant pitch pattern structure, and a variable pattern of protrusions. The housing may include at least one input light port on at least one end of the light pipe core. The light source may include a light housing and at least one light-emitting diode (LED), and the light housing may be made of a reflective material. The light source may include at least one additional light housing and LED. The housing may also include first and second reflective shells configured to surround the light pipe core.

In another implementation, a document sensing arrangement is disclosed. The document sensing arrangement includes a light source subassembly for positioning on a first side of a document passageway, and at least one light sensor for positioning on a second side of the document passageway across from the light source subassembly. The subassembly includes a housing, a light pipe core seated in the housing and having a top diffusing surface, a light control layer associated with the top diffusing surface, and at least one light source coupled to the housing.

This implementation may include one or more of the following features. The light control layer may be a light control film. The subassembly may include a prism structure layer between the top diffusing surface and the light control layer, and the prism structure layer may be a brightness enhancing film. The diffusing surface may include at least one of a random rough structure, a constant pitch pattern structure, and a variable pattern of protrusions. The housing may include at least one input light port on at least one end of the light pipe core. The light source may include a light housing and at least one light-emitting diode (LED). An additional light housing and LED may be included, and the LED's may be of different wavelengths. The light housing may be made of a reflective material. The housing may also include first and second reflective shells configured to surround the light pipe core.

Also described is a method for illuminating a document in a document passageway. The technique includes providing a subassembly that includes a reflective housing, a light pipe core having a top diffusing surface, a light control layer, and at least one light source, and illuminating the document with a substantially rectangular beam of substantially homogenous light.

Implementations of the method may include one or more of the following features. The method may include utilizing a prism structure layer in the subassembly to increase the light intensity output. The method may also include generating signals indicative of document authenticity based on the light passing through a document, or generating signals indicative of document authenticity based on the light reflecting from a surface of a document.

A further technique according to the invention pertains to a method of fabricating a document validator subassembly. The method includes fabricating a light pipe core to provide light output across a document passageway, fabricating a diffusing structure onto an output side of the core, and applying a light control film to the diffusing structure.

Implementations of this method of fabrication may include one or more of the following features. The technique may also include connecting a reflective housing to the light pipe core. In addition, the method may include coupling at least one LED light source package to the housing, and may also include applying at least one layer of brightness enhancing film between the diffusing structure and the light control film.

Another light bar structure fabrication technique according to the invention includes fabricating a light pipe core to provide a light output across a document passageway, fabricating a diffusing structure layer, and fabricating a louver structure layer onto an output side of the core.

Implementations of this method may include one or more of the following features. A reflective housing may be connected to the light bar structure. At least one LED light source package may be coupled to the housing. A prism structure layer may be fabricated below the louver structure layer.

Advantages of the described configurations include a document validator subassembly that provides homogenous illumination of a document over the entire height and width of the bill passageway, which limits signal variations over the range of inserted document positions to result in more accurate validation processing. Disclosed implementations of the subassembly configurations also illuminate the entire width of the document passageway, which permits a full scan of the entire surface of a document to improve the security of document recognition. The design also permits use of a plurality of wavelengths of light from a minimum amount of light source components, and the subassembly has a compact size that is ideal for use in a document validator that has limited physical space.

BRIEF DESCRIPTION OF THE DRAWINGS

FIG. 11 is a simplified drawing of another implementation of a light pipe core for use in a subassembly according to the invention.

FIGS. 12A to 12C illustrate various geometric mappings of LED dies suitable for use with the light pipe core of FIG. 11.

DETAILED DESCRIPTION

Figure 1:
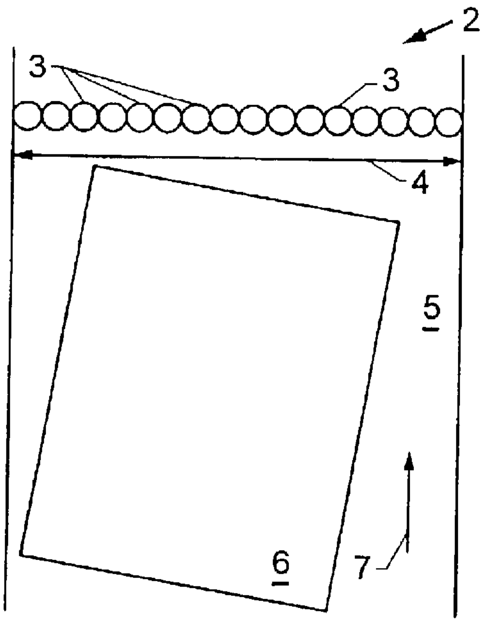
FIG. 1 is a simplified top view of a document passageway to illustrate a light spot configuration covering the width of the document passageway.

FIG. 1 is a simplified top view of a document passageway 5 having a light spot configuration 2 of a plurality of light spots 3 arranged in a single line to cover the width 4 of a document passageway 5. The width 4 is wider than the widest document of a set of documents to be sampled, and a banknote or bill 6 is shown that is narrower than the document passageway. In this example, the document 6 is skewed slightly as it travels in the direction of arrow 7.

It should be noted that the term “document” means any substantially flat item of value including, but not limited to, banknotes, bank drafts, bills, coupons, cheques, tokens, coins, paper currency, security documents and any other similar objects of value. Similarly, although the subassemblies are described herein with regard to their use in document validators, the subassemblies could be used in other devices.

Referring again to FIG. 1, the spots 3 may be generated by one or more light sources, typically by one or more light emitting diodes (LEDs). Such a configuration permits substantially 100% scanning coverage of an inserted bill 6 as it moves in the direction of arrow 7 through the bill passageway. In particular, the bill may be transported between the light source or sources and one or more light receiving sensors (not shown) arranged on the opposite side of the passageway. In such a configuration, signals generated by the receivers correspond to the light transmitted through the bill and can be processed to determine information such as bill length and width, bill position at any particular moment in time, bill authenticity, and country of origin of the bill. Light receivers could also be arranged on the same side as the light sources to receive light reflected from the bill.

An implementation may use between ten to twelve light spots across the bill passageway for sampling data from a bill, but more or less spots could be used. Each spot may be approximately 7.5 mm in diameter with each spot being sampled at three or more wavelengths. For example, light spots having wavelengths in the visible, infrared and near infrared spectrum could be used and the resultant data processed to glean different types of information from a bill. Signal processing techniques to determine bill characteristics, authenticity, nationality, denomination and/or bill position in the passageway are beyond the scope of the present application and will not be discussed in detail herein.

Figure 2:
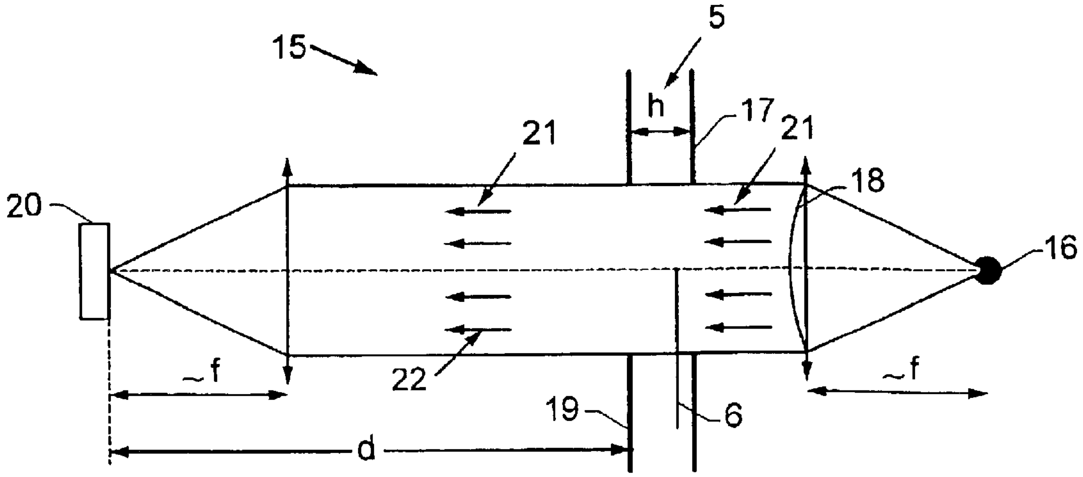
(PRIOR ART) FIG. 2
FIG. 2 is a side view of a conventional LED light source and receiver configuration.

FIG. 2 is a side view of a conventional configuration 15 of a single LED light source and receiver wherein the light source 16 and receiver 20 are on opposite sides of the bill passageway 5. The LED source 16 is placed close to the focal point of a convergent lens 18 to generate substantially parallel beams of light 21 through an opening in the front wall 17 of the bill passageway 5 towards the bill 6. Part of the bill blocks some of the light beams 21 resulting in transmitted light signals 22 which have passed through the bill. A detector 20, such as a PIN diode which may include a focusing lens, is placed a sufficient distance “d” from the rear wall 19 so that noise inherent in the light transmitted through the bill is minimized. The height “h” of the bill passageway may be approximately 2 mm to 2.5 mm, which is adequate to minimize the jam rate of bills, and the width 4 of the bill passageway (shown in FIG. 1) may be greater than 90 mm to accommodate bills of various widths.

In order to simplify the data processing required to authenticate a bill, substantially homogenous illumination of the bill is desirable. In practice, due to the size and light transmission features of existing LED light sources, generation of a parallel beam and a homogenous spot can only be approximated with a configuration of the type shown in FIG. 2. A group of such sensors positioned in a configuration like that shown in FIG. 1 may be sufficient to determine document position, but the signals generated are not entirely satisfactory for generating data to determine authenticity. Further, when several LED dies are used, the minimum spacing of the dies may result in spot offsets, and thus tight tolerances must be imposed on die placement which increases fabrication costs.

Figure 3:
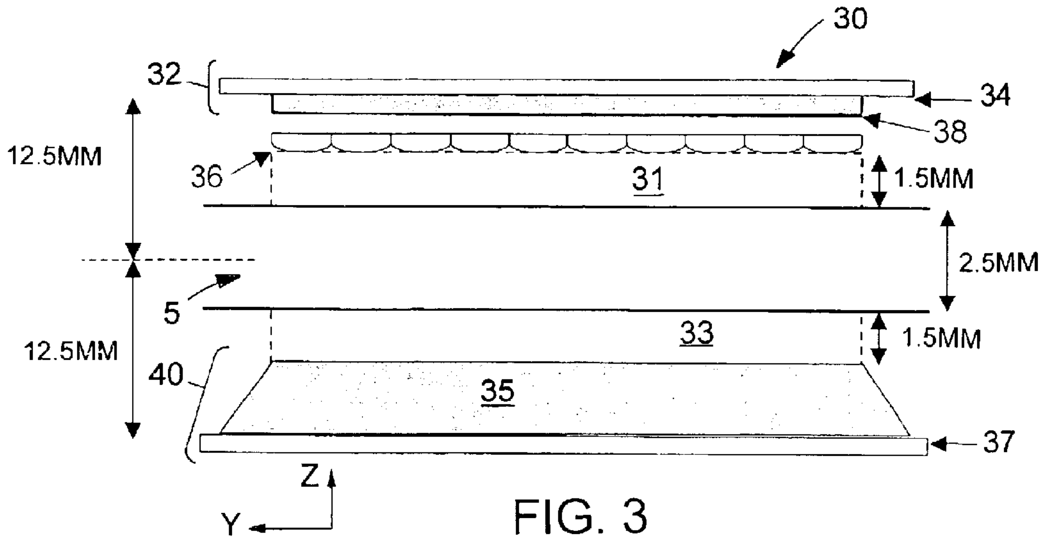
FIG. 3 is a simplified, enlarged, cross-sectional end view of a document validator configuration including a subassembly according to the invention.

FIG. 3 is a simplified, enlarged, cross-sectional end view of an implementation of a document validator configuration 30. The configuration 30 includes a light sensor arrangement 32 on a first side of a document passageway 5, and a subassembly 40 that includes light bar 35 on the second side of the passageway. In this implementation, two transparent windows 31 and 33, which may be composed of LEXAN™ material, define a portion of the document passageway 5 therebetween. The light sensor arrangement 32 includes an array of ten lenses 36 arranged in front of a sensor array 38 of ten detectors mounted on a printed circuit board (PCB) 34. The detectors generate electric signals corresponding to the light that is transmitted through a document as it travels through the passageway 5 between the light source and the sensors, which signals are then processed by a microprocessor (not shown) connected to the PCB 34. A suitable array of detectors could also be positioned on the same side of the passageway as the light source, to generate signals based on the light reflected from a document. The signals generated by the detectors may be used to determine the validity of the document.

The light bar 35 of FIG. 3 is mounted to a light PCB 37, and provides light which exits from a top surface in the Z-direction to illuminate a document at a constant level regardless of the position of the document in the volume of the document passageway 5. As the document is transported past the document validator configuration 30, it may be closer to either the light sensor arrangement 32 or to the subassembly 40 depending on the transport conditions and/or the condition or fitness of the document. For example, a particular transport mechanism may transport a banknote past the arrangement 30 at a constant speed, but the exact position of the banknote within the height "h" of the passageway 5 may vary from one banknote to another. The position may depend upon whether a particular banknote is a crisp, new bill or an old, worn and limp bill. For use in a document validator, the light radiated by the light bar 35 should cover an area of at least 70 millimeters (mm) in length (width of a bill passageway) and at least 7 mm in depth, and be uniform through the height "h" of approximately 2.5 mm. However, the geometry of the light pipe core, which includes a long side and a substantially smaller short side, may result in a large difference in irradiation at different heights "h". Use of a suitable light control film (LCF), which is explained in detail below, overcomes the geometrical limitations of the irradiation patterns to enable a document to be illuminated at a constant level regardless of its position within the height "h" of the passageway.

Figure 4A:
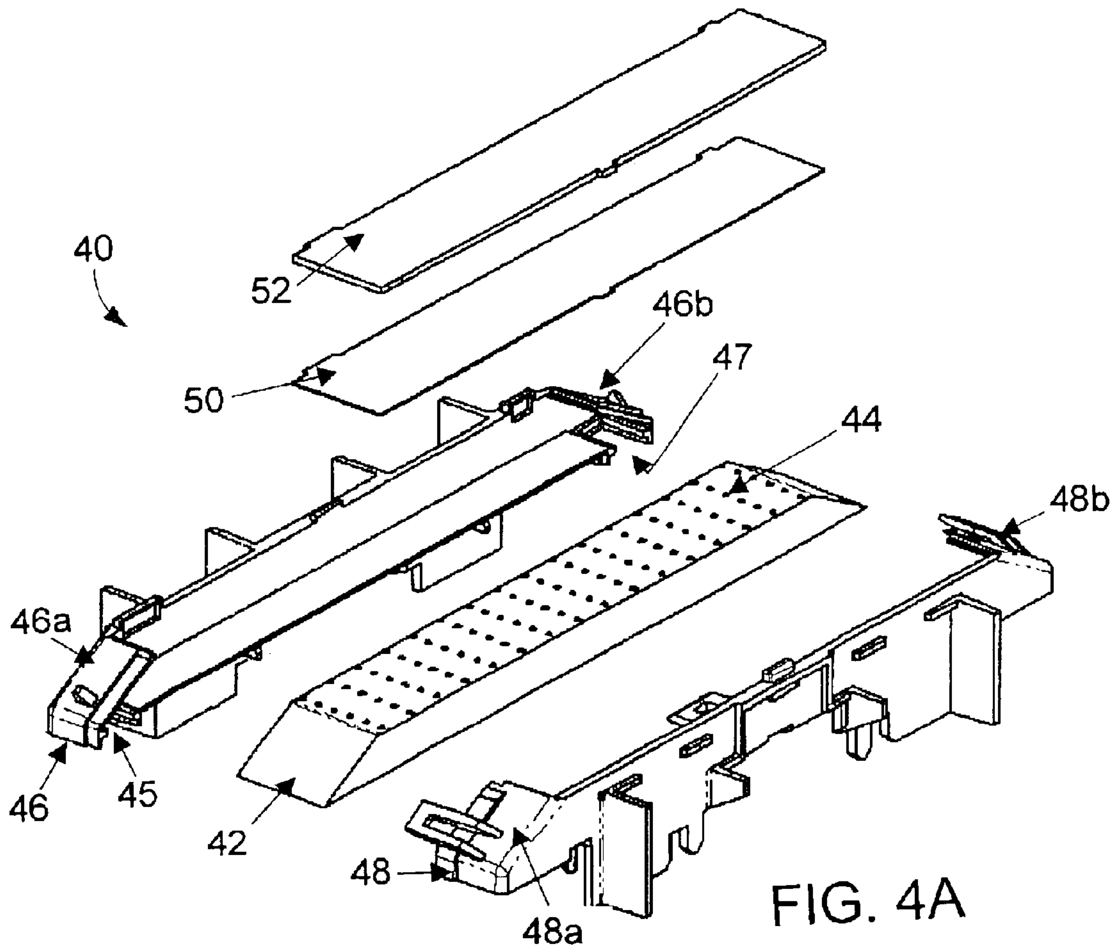
FIG. 4A is an exploded and perspective view of an implementation of a document validator subassembly according to the invention.
Figure 4B:
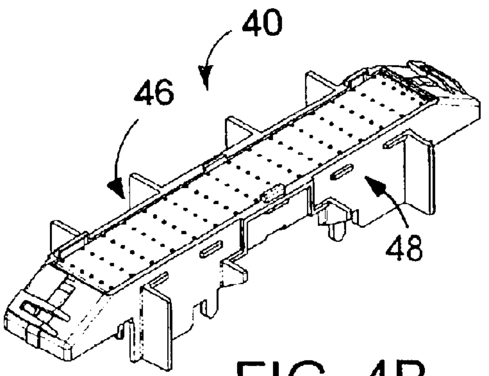
FIGS. 4B and 4C illustrate an implementation of the subassembly of FIG. 4A without films and with at least one film, respectively.
Figure 4C:
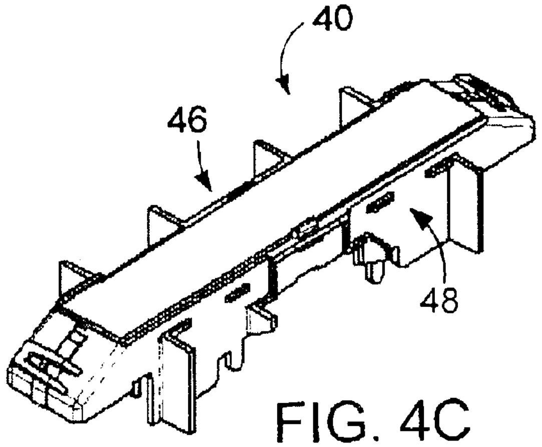

FIG. 4A is an exploded and perspective view of an implementation of a document validator subassembly 40. The subassembly includes a light pipe core 42 that includes a top surface 44. A first reflective shell 46 and a second reflective shell 48 are configured to surround the light pipe core, and a brightness enhancement film (BEF) 50 and light control film (LCF) 52 are arranged for attachment to the top surface 44 of the light pipe core. FIG. 4B illustrates an implementation of the subassembly 40 of FIG. 4A without the BEF 50 or LCF 52 attached, and FIG. 4C illustrates another implementation of the subassembly 40 of FIG. 4A with at least one of the BEF 50 and LCF 52 attached. The two reflective shell parts 46, 48 are clipped together around the light pipe core 42 as shown in FIGS. 4B and 4C so that there is minimal space between the core and the shell.

Referring again to FIG. 4A, the light pipe core 42 may be made of a transparent polycarbonate or acrylic material, and all the faces except for the top surface 44 may be polished to favor internal reflections. The first and second reflective shells 46 and 48 may be made of a white grade of polybutylene terephtalate (PBT) polymer material. The interior surface may comprise a reflective material, and the material may be white and may be diffusely reflective. A suitable PBT reflective material is available from the Bayer Company under the trade name "Pocan B 7375", but similar white and diffusive material such as Spectralon™ could also be used. A white material permits a suitable substantially flat spectral response to occur across at least the visible wavelength to the near infra-red wavelength spectrum region. A first aperture 45 and a second aperture 47 located at both extremities of the protective shell form input ports for light sources (not shown), while the top surface 44 forms the output light area. The output light area may have a diffuser structure to extract the light from the core. A suitable diffuser structure could be made by sanding the surface to obtain a random, rough pattern, or by molding a rough, random structure on the top surface 44. Other diffuser structures could also be used.

Figure 5:
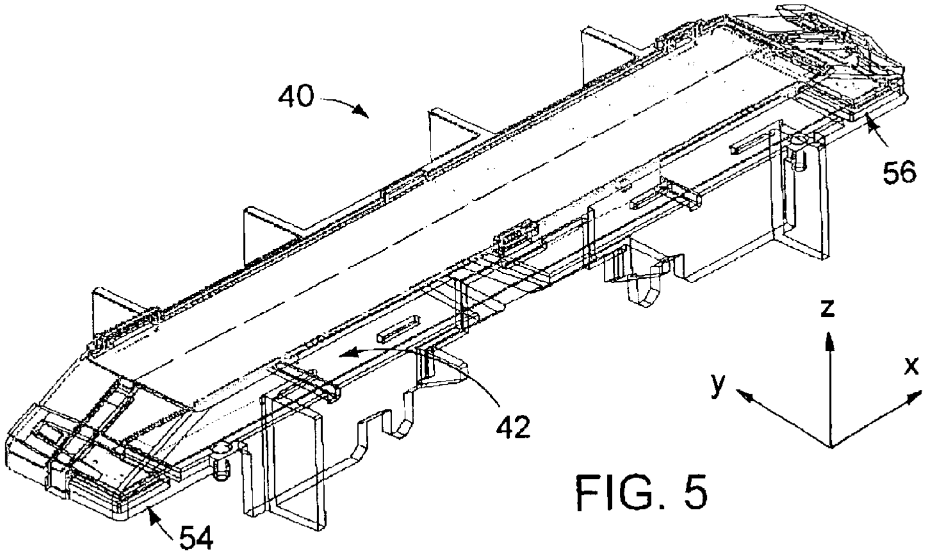
FIG. 5 is a cutaway perspective view of a subassembly according to FIGS. 4A to 4C.

FIG. 5 is a cutaway perspective view of the subassembly 40 of FIGS. 4A–4C to illustrate the placement of a first multi-die LED package 54 and a second multi-die LED package 56. The multi-die packages 54 and 56 may each contain two or more LED's, and in this implementation are located at opposite ends of the light pipe core 42 to form the light sources. The LED's may be of different wavelengths or may be of the same wavelength. If different wavelength LED's are utilized, they may be in the same LED package or in different LED packages. In this arrangement, the LED's are mounted horizontally on a PCB, and the light pipe core has a generally trapezoidal shape as shown in FIGS. 4A–4C. It should also be understood, however, that a single LED light source positioned, for example, at the first aperture 45 only, could be used in some applications.

Figure 6A:
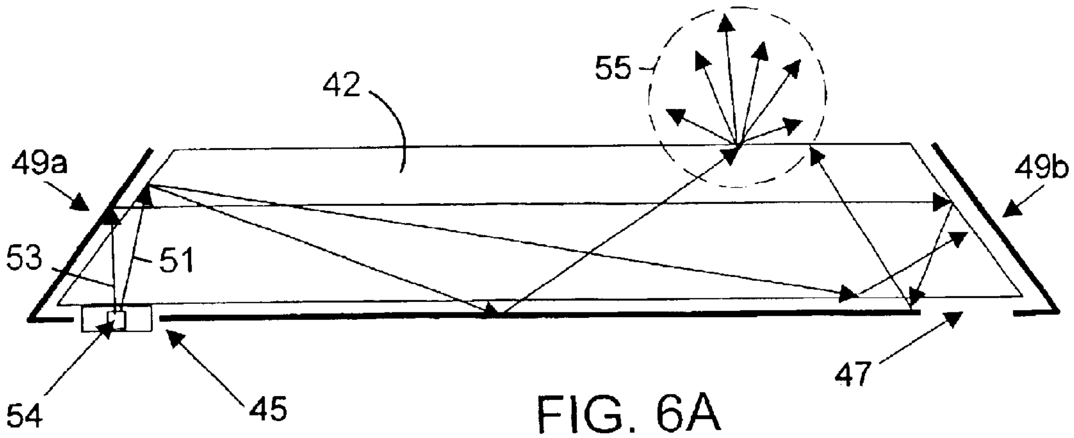
FIG. 6A is an enlarged, simplified, cross-sectional schematic diagram of a subassembly according to the invention.

FIG. 6A is an enlarged, simplified, cross-sectional schematic diagram of a light pipe core 42 to illustrate how light from the LED source 54 exits the top surface 44. In particular, FIG. 6A depicts light from the LED source 54 entering the light pipe core 42 via input port 45 (formed by reflective shell portions 46 and 48 shown in FIG. 4A). The first angled wall **49*a* is a combination of walls 46*a* and 48*a* shown in FIG. 4A, and the second angled wall 49*b* is a combination of walls 46*b* and 48*b* shown in FIG. 4A. In the light pipe core 42 implementation of FIG. 6A, light is reflected either by total internal reflection (TIR) for rays having an incidence greater than the critical angle (defined by the refraction index of the transparent plastic, typically 1.5) such as ray 51, or by reflection of the walls of the mixer shell surrounding the light pipe for rays of incidence lower than the critical angle, such as light ray 53. Reflected light rays may be sent back into the mixing structure to be reflected multiple times as shown until the beam reaches a diffuser area on the top surface 44 and exits as schematically shown in area 55. The light from the LED's is generally deflected horizontally across the light pipe due to the slope of the trapezoidal shape of the side walls 49*a* and 49*b***.

FIG. 6A also shows an input port 47 which may accommodate another light source. However, it should be understood that only one light source may be used on one end of the light pipe core 42, such as at input port 45. If such a configuration were used, then the input port 47 would be replaced with a reflective material to enhance the internal light reflection characteristics of the subassembly.

Figure 6B:
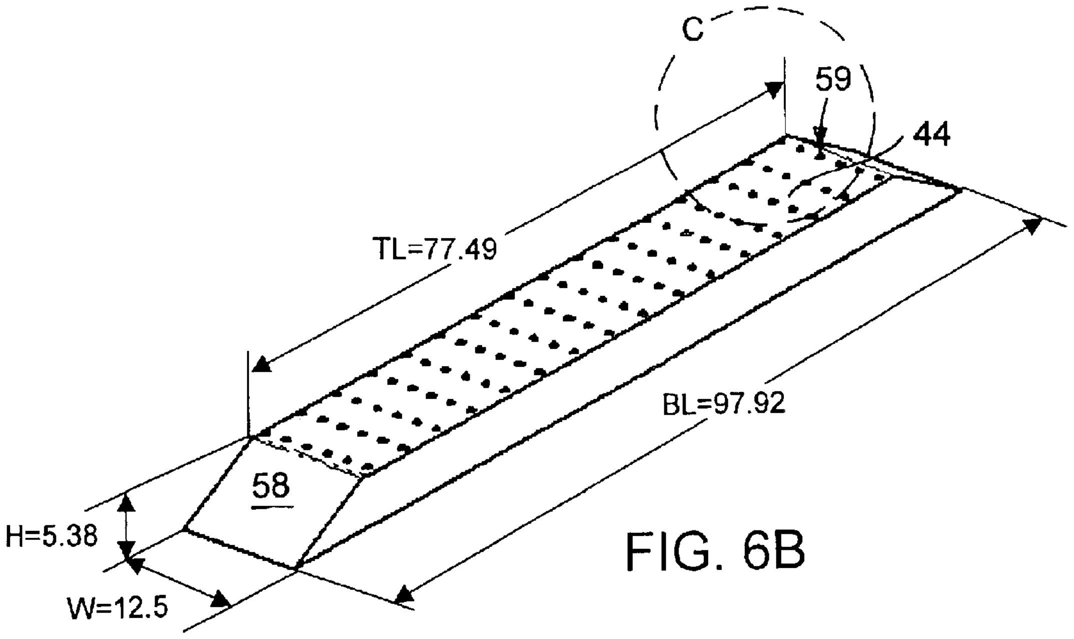
FIG. 6B illustrates dimensions of a light pipe core suitable for use in a bill validator.
Figure 6C:
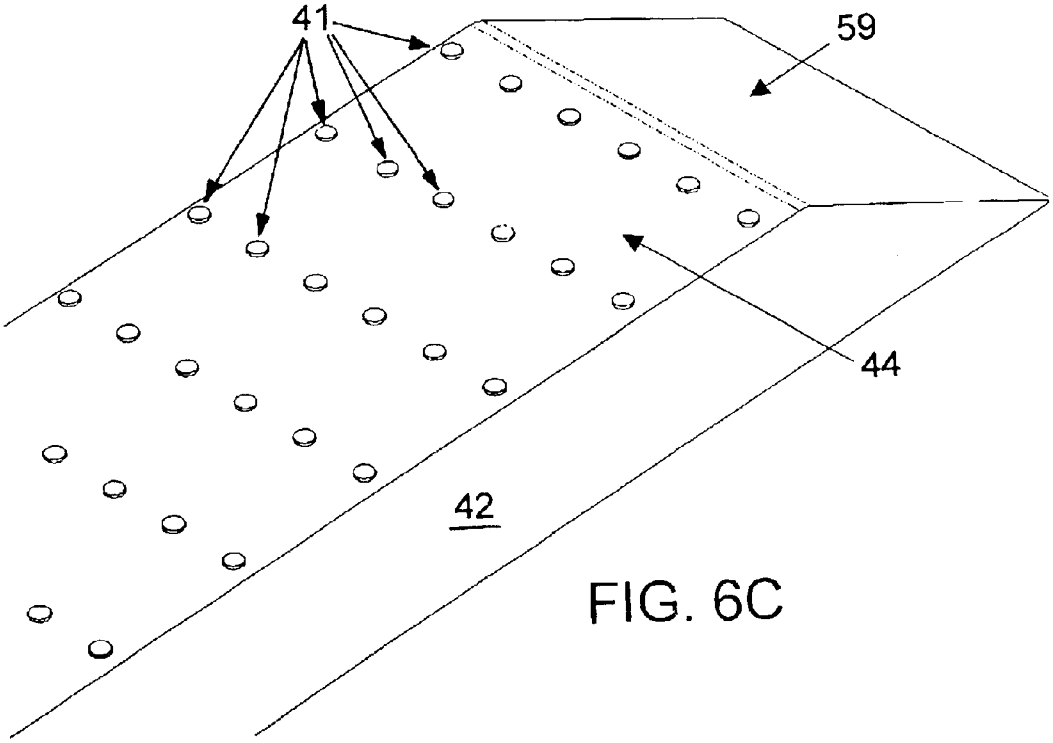
FIG. 6C depicts an enlarged portion C of FIG. 6B.

FIG. 6B illustrates the dimensions of an implementation of a light pipe core 42 suitable for use in a bill validator. A suitable light pipe core has a bottom length BL of about 97.92 mm, a width W of about 12.5 mm and a height H of about 5.38 mm. The top length TL is about 77.49 mm and is approximately centered over the bottom length such that the slope of the first end portion 58 and the slope of the second end portion 59 are substantially the same. The slope of these portions may be matched by the first angled wall 49*a* and the second angled wall 49*b* formed by the first and second reflective shell portions 46, 48. The top surface 44 of the light pipe core may include a diffuser surface 43 to control the light intensity output. FIG. 6C illustrates an enlarged portion C of FIG. 6B, wherein an array of protrusions 41 is arranged on top surface 44 in a pattern. The pitch of the protrusions may be adjusted to balance the intensity of the light coming out along and across the light bar so that the light distribution is substantially homogeneous. In an implementation, the density of the protrusions increases as the diffuser area is further away from the LED sources. In this manner, areas of local spots are created where the TIR conditions are destroyed and the light can exit the core. In an implementation, the protrusions are substantially cylindrical in shape, but other shapes are possible.

Figure 7:
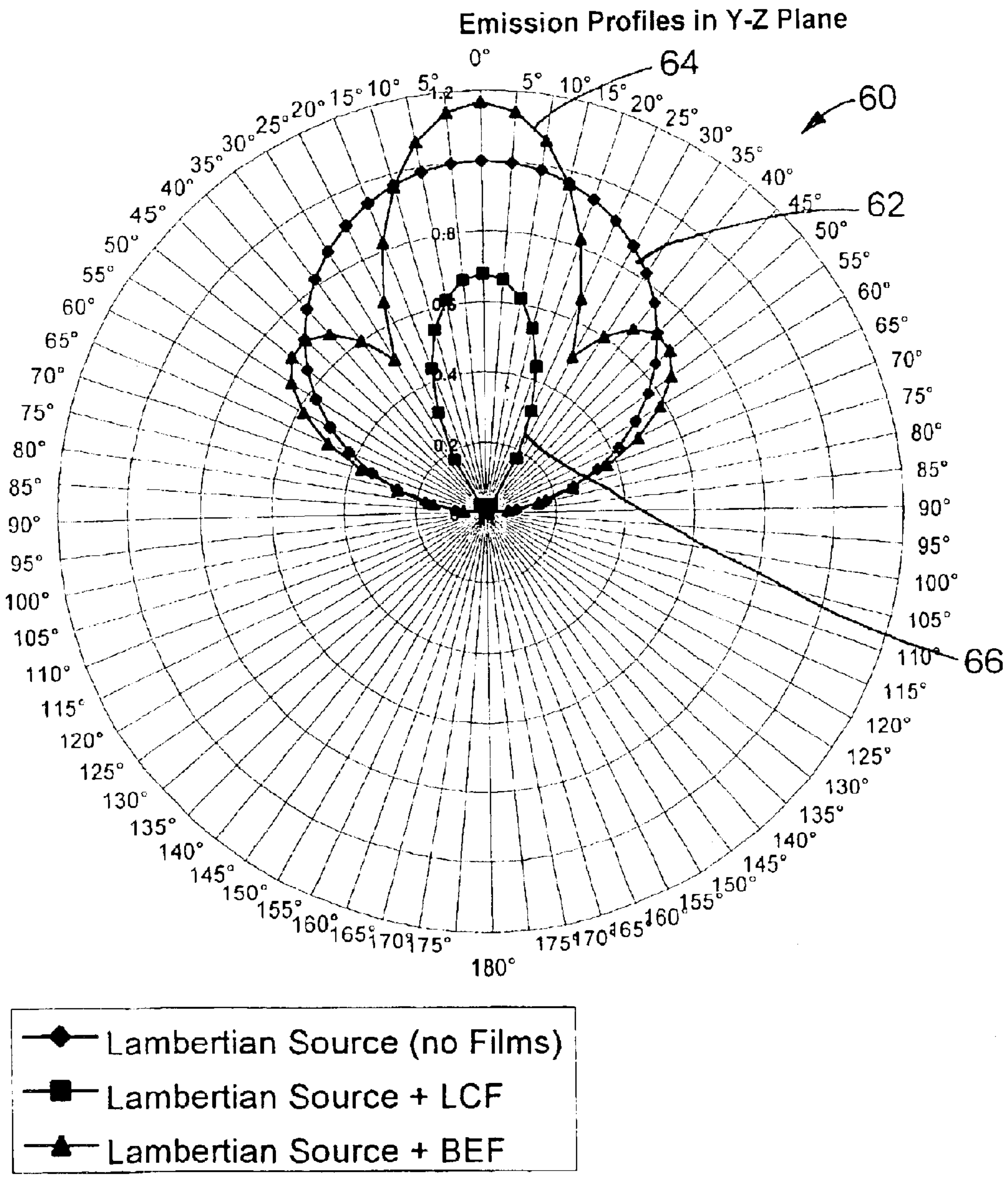
FIG. 7 illustrates emission profiles, including a substantially lambertian lobe pattern, a light output pattern resulting from the light passing out of the light core and through a brightness enhancing film, and a controlled light pattern generated by a light control film.

FIG. 7 is a simplified drawing illustrating approximate polar plots of emission profiles 60 of the subassembly in a Y-Z plane (see FIG. 10) from an implementation of a subassembly. In particular, a substantially lambertian lobe pattern 62 of light radiates out from the diffuser surface 43 of the light pipe core in the absence of any films. But a light output pattern 64 occurs if the light also passes through a first layer of brightness enhancement film (BEF) 50 as shown in FIG. 4A. As shown in FIG. 7, the light exits the BEF with a narrower lobe, wherein the radiation angle is limited to an output angle of approximately 35° (70° total angle, depending on the type of BEF). The light that exits the diffuser at an angle greater that the output angle is partially reflected back into the light pipe core 42 by the film and recycled, increasing the global output signal available in the selective output angle (±35°). FIG. 7 also includes a controlled light pattern 66 resulting from light passing through a light pipe core and an LCF. The LCF may function to generate a narrow 60° output angle defined at 5% residual intensity. This creates a pseudo collimating effect with a much more compact design than would be achieved using a classic collimating lens, and without the dimensional constraints of a minimum focal distance.

Figure 8:
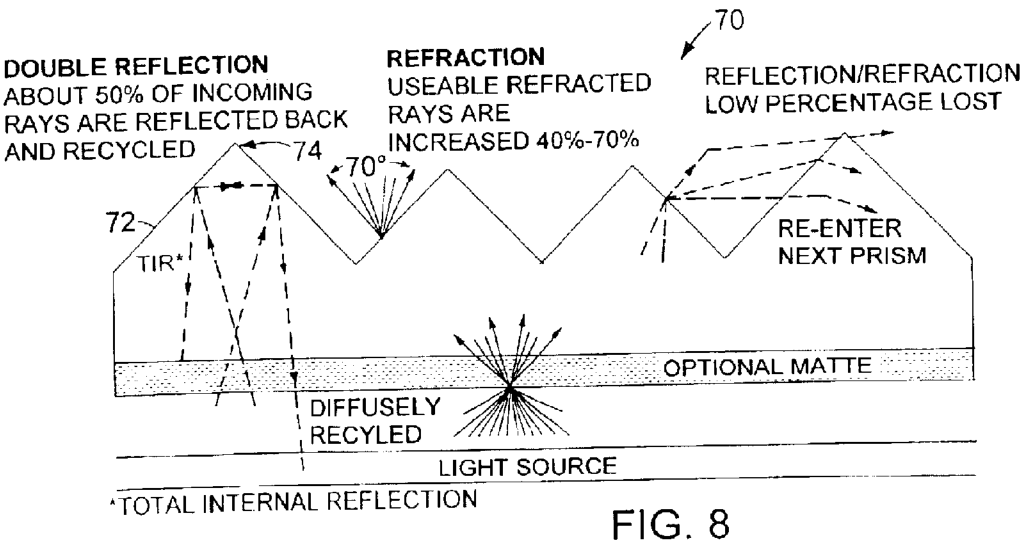
FIG. 8 is an enlarged, simplified side-view schematic diagram illustrating the prismatic structure of a brightness enhancing film.

FIG. 8 is an enlarged, simplified side-view schematic diagram 70 illustrating the prismatic structures 72 of a suitable BEF, which is commercially available and manufactured by the Minnesota Mining and Manufacturing Corporation (the "3M Company"). Each prismatic structure 72 has an apex 74 that is substantially parallel to its neighbors. As shown, about 50% of light rays from a light source are reflected back and recycled by the BEF, and usable refracted rays are increased by 40% to 70%.

Figure 9:
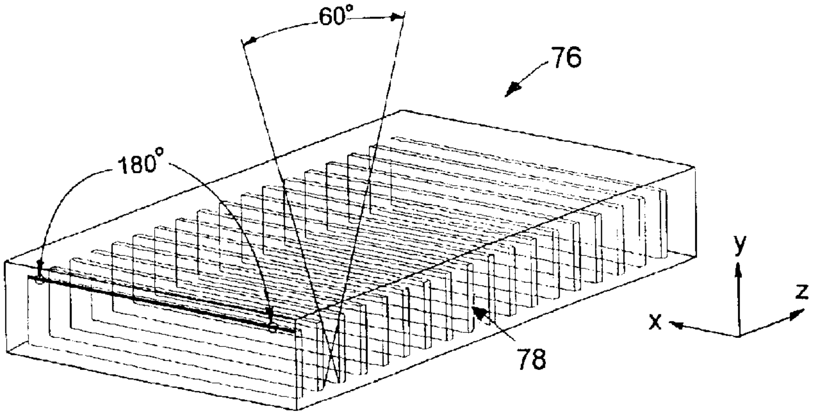
FIG. 9 illustrates the louvered structure of a light control film.

FIG. 9 illustrates the louvered structure 76 of a suitable LCF. The louvers 78 operate like miniature venetian blinds to limit the output angle of light from a source in a direction "Z" that is perpendicular to the lower structure at the cost of some energy loss. In the example shown, light output from the source in a Y-direction is limited to 60°, whereas the light output from the source in the X-direction is not channeled, and thus is unconstrained at an 180° pattern. Suitable LCF's are manufactured by the 3M Company.

Figure 10A:
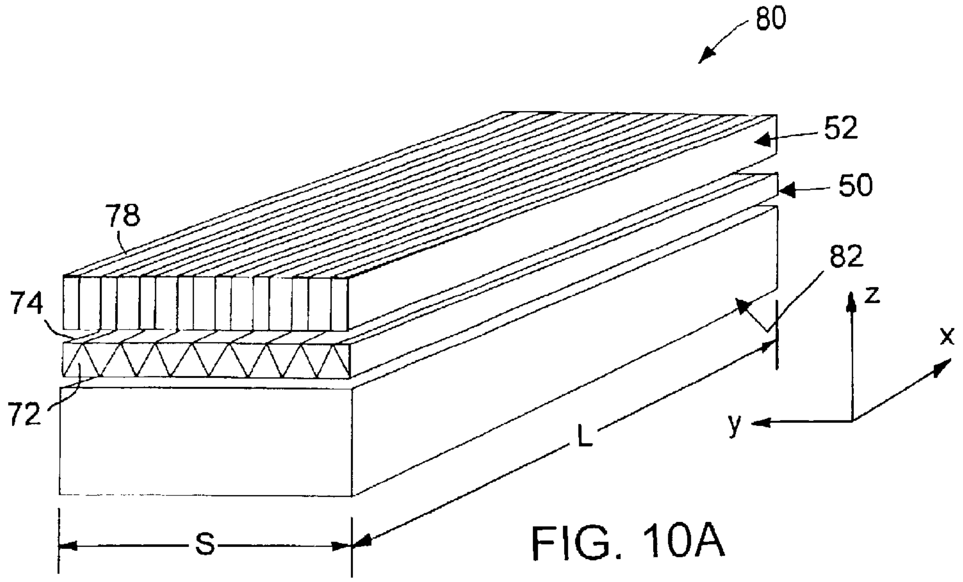
FIG. 10A is an enlarged, simplified perspective view schematic diagram of an alternate implementation of a light assembly according to the invention.

FIG. 10A is an enlarged, simplified, exploded, perspective view schematic diagram of an alternate implementation of a light core assembly 80 for a document validator. A suitable configuration of components includes a rectangular light pipe core 82 which may include a top diffusing surface, a BEF 50 and an LCF 52 for supplying light in a document validator. The BEF is aligned so that each apex 74 of the prism structures 72 are substantially parallel with the louvers 78 of the LCF, and are substantially parallel to the edge of the long dimension "L" of the light pipe core 82, and perpendicular to the short side "S" of the core. A suitable BEF available from the 3M Company is BEF 90/50, where 90 is the prism angle and 50 is the prism pitch in micrometers ($\mu$m). A suitable type of LCF available from the 3M Company is the LCFP, which has a 60° viewing angle for a cut-off at 5% maximum transmission. The reduced thickness of the films (less than 0.2 mm for the BEF and less than 1 mm for the LCF) is advantageous compared to conventional light source assemblies that use lenses.

Figure 10B:
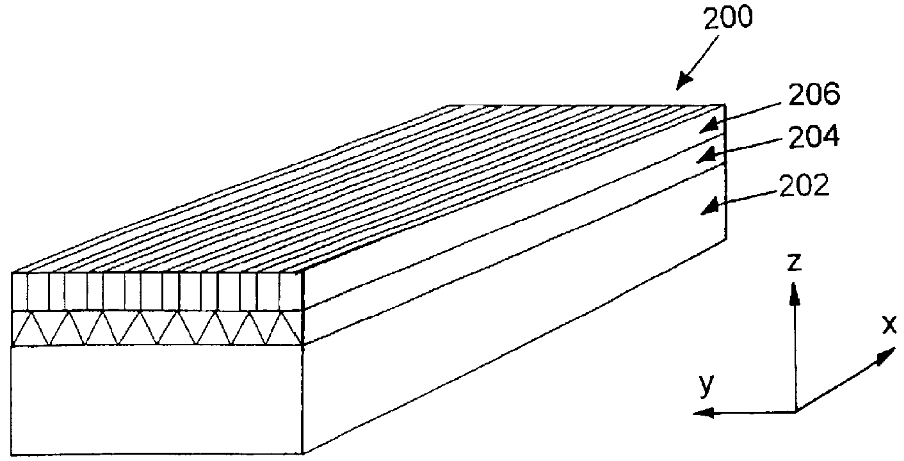
FIG. 10B is an enlarged, simplified perspective view schematic diagram of another implementation of a light assembly according to the invention.

FIG. 10B illustrates an alternate implementation of a light core assembly 200 which may have the same dimensions of FIG. 10A and be suitable for use in a document validator. The light core assembly 200 may be of unitary construction, and may include a light core 202, a prism structure layer 204 for increasing the light intensity that will be output, and a louver structure layer 206 for controlling the direction of the light as it exits the assembly in the Z-direction. A light diffusing layer (not shown) may also be included. It should also be understood that an embodiment containing more or less layers could also be utilized for some applications. For example, an embodiment including a light core 202, a diffusing layer and a louver structure layer 206 may be suitable for use in a document validation application. Other variations, for example, one including only the light core 202 and prism structure 204, could also be utilized.

FIG. 11 is a simplified drawing of another implementation of a light pipe core 84 that could be realized as described above with reference to FIGS. 10A and 10B. In this implementation, the LED's may be positioned vertically and the light pipe core can be a simple rectangular parallelepiped as shown. In an application, six wavelengths are used, and a single LED package can accommodate two or three dies. For some wavelengths, two dies can be used, one at each end of the light pipe. For other wavelengths, four dies can be used, arranged two by two at each end of the light pipe. FIG. 12A is a geometrical mapping of dies in the packages for each wavelength when four dies are used, and FIGS. 12B and 12C when only two dies are used. In a suitable configuration, to optimize the light output, each LED package may include a white, reflective housing or packaging, and the apertures 45 and 47 (see FIG. 4A) are of minimum size to accommodate the package and to limit any light losses through inefficient coupling. The interior surface of the light housing for each LED source may comprise a reflective material, and the material may be a diffusely reflective material. Suitable LED packages are the TOPLED™ series from the OSRAM Company. The LED package can be of a similar plastic material as the reflective shell. For example, the light housing may be made of a white material to permit a substantially flat spectral response to occur across at least the visible wavelength to the near infra-red wavelength spectrum region. Light is extracted from the light pipe core 84 by a diffuser structure that may be made either by sanding the surface, or by creating a molded, rough random structure on the top side of the light pipe core. Alternately, an array of protrusions could be formed on the top surface to function as a diffuser, as explained above with reference to FIG. 6C. In addition, other diffuser structures could also be utilized.

Figure 13:
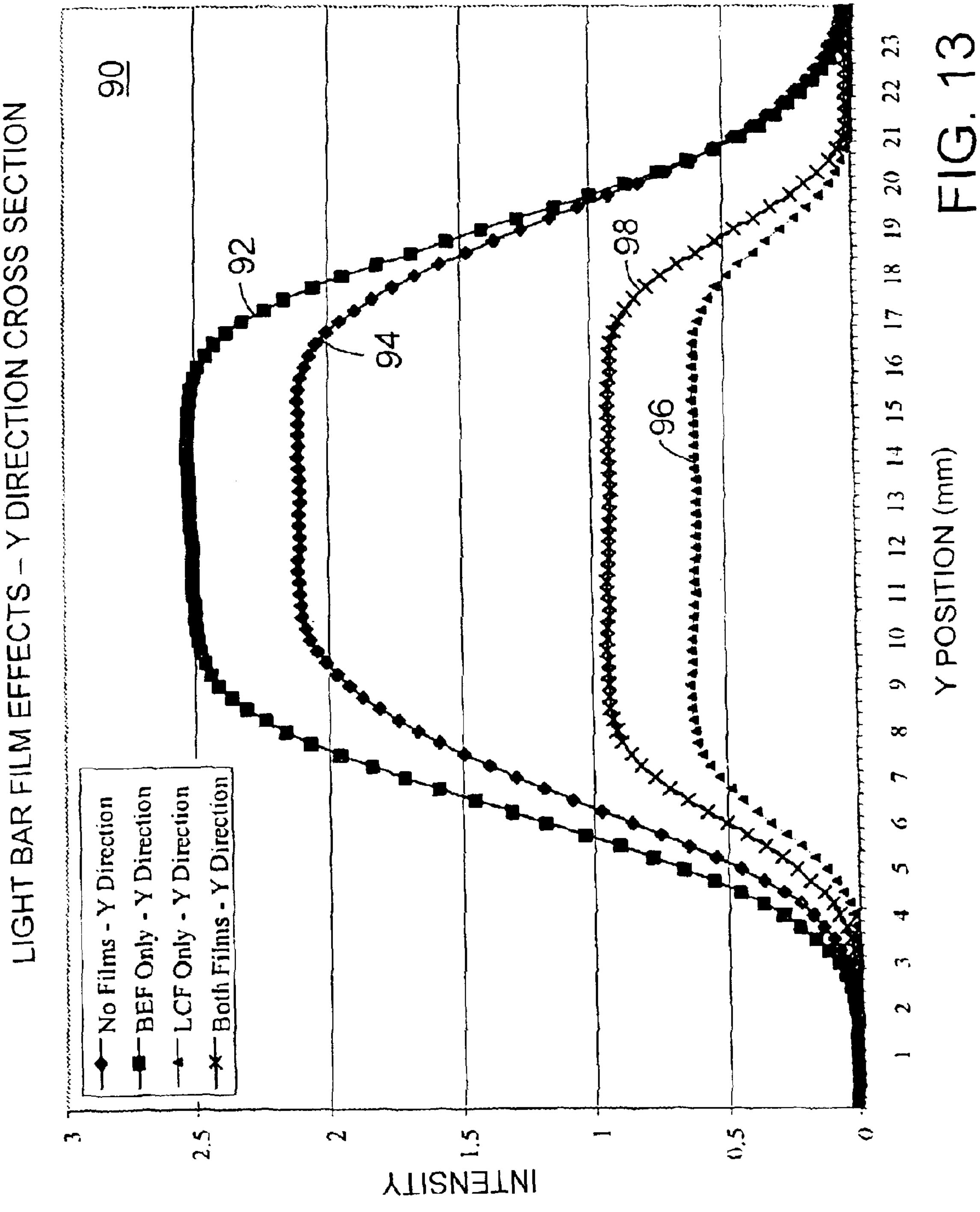
FIGS. 13–18 are plots of experimental results obtained to measure the effectiveness of a subassembly according to the invention.
Figure 14:
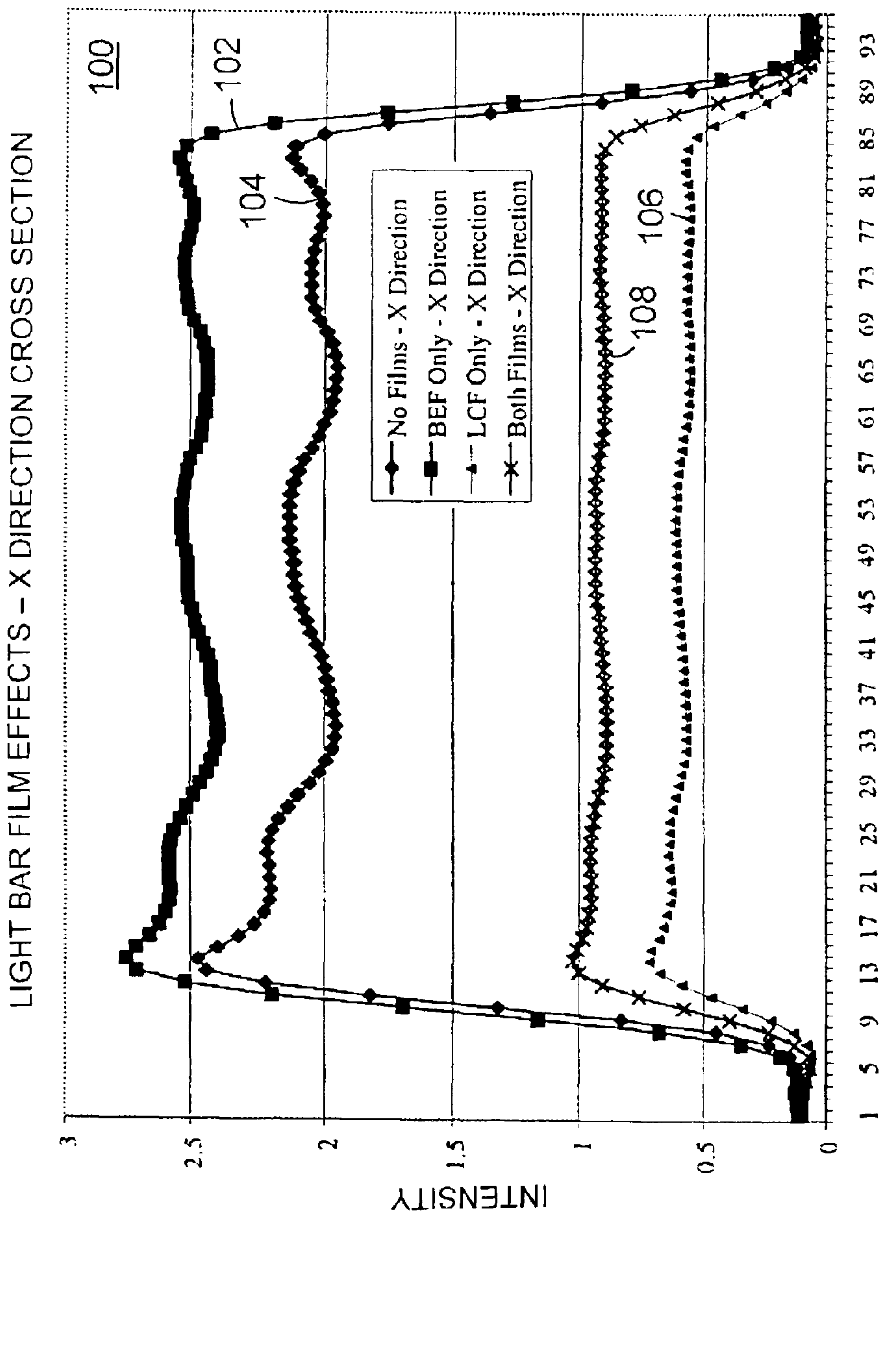

FIGS. 13–18 are plots of experimental results obtained to measure the effectiveness of the subassembly 40. In these figures, the Y position corresponds to the light output of the short dimension of the light pipe core in millimeters (mm), and the x position corresponds to the light output along the long dimension of the light pipe core in mm. FIG. 13 is a plot of intensity in the y dimension 90 (short side) and FIG. 14 is a plot of the intensity in the x-dimension 100 (long side). In FIG. 13, the plot 92 is for the case where a BEF and a light pipe core was used, the plot 94 is for the case where the light pipe core was used alone (as in FIG. 4B), the plot 96 is for the case where the light pipe core plus a LCF was used, and the plot 98 is for the case where the light pipe core plus both a BEF and a LCF were used (see FIG. 4C). Corresponding resulting plots 102, 104, 106 and 108 occurred for measurements in the x-direction as shown in the plot of intensity in the x-direction 100 of FIG. 14. The plots of FIGS. 13 and 14 both demonstrate that the BEF film increases the overall light intensity output, and that the LCF film homogenizes the light signal at a cost of some light intensity output.

Figure 15:
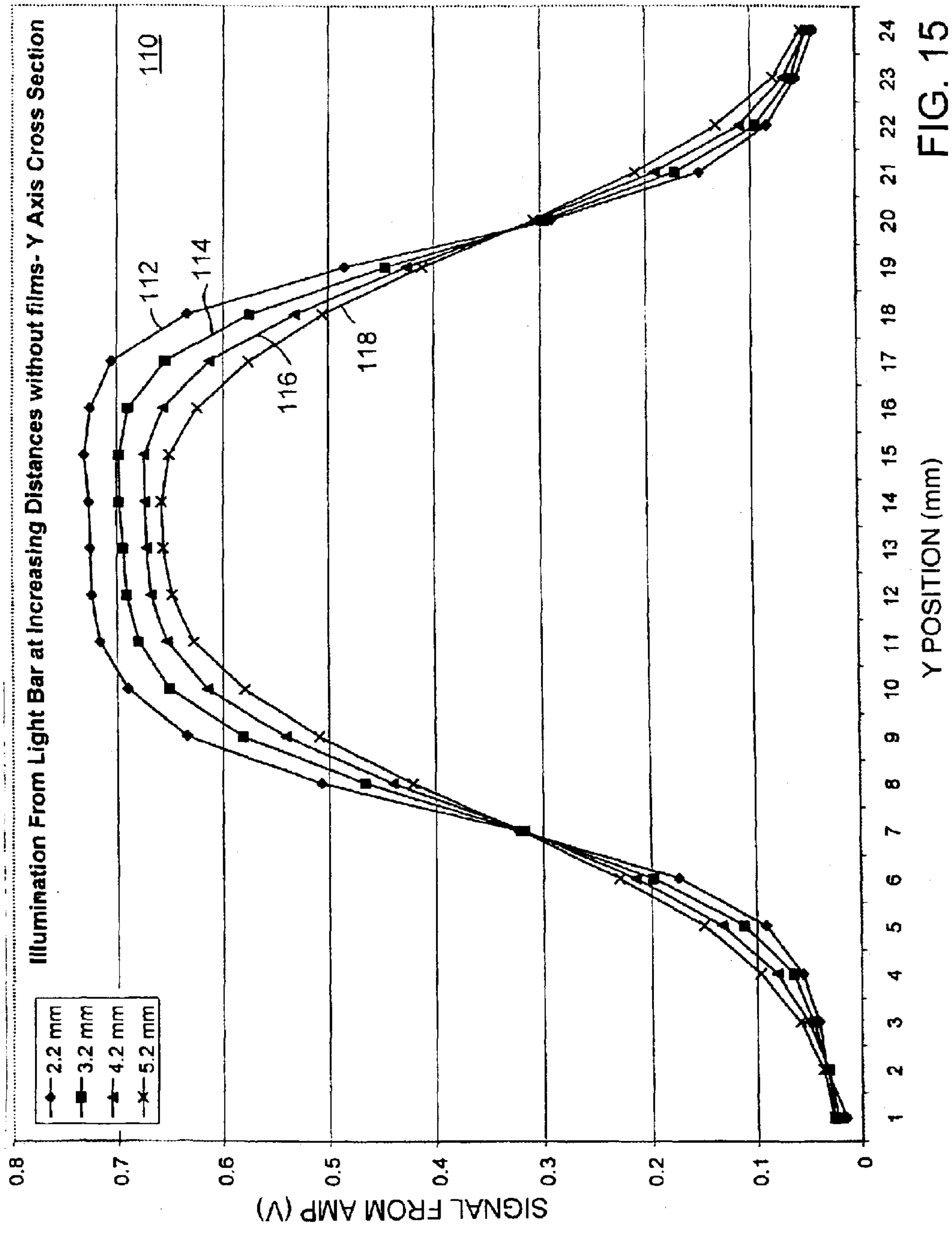
Figure 16:
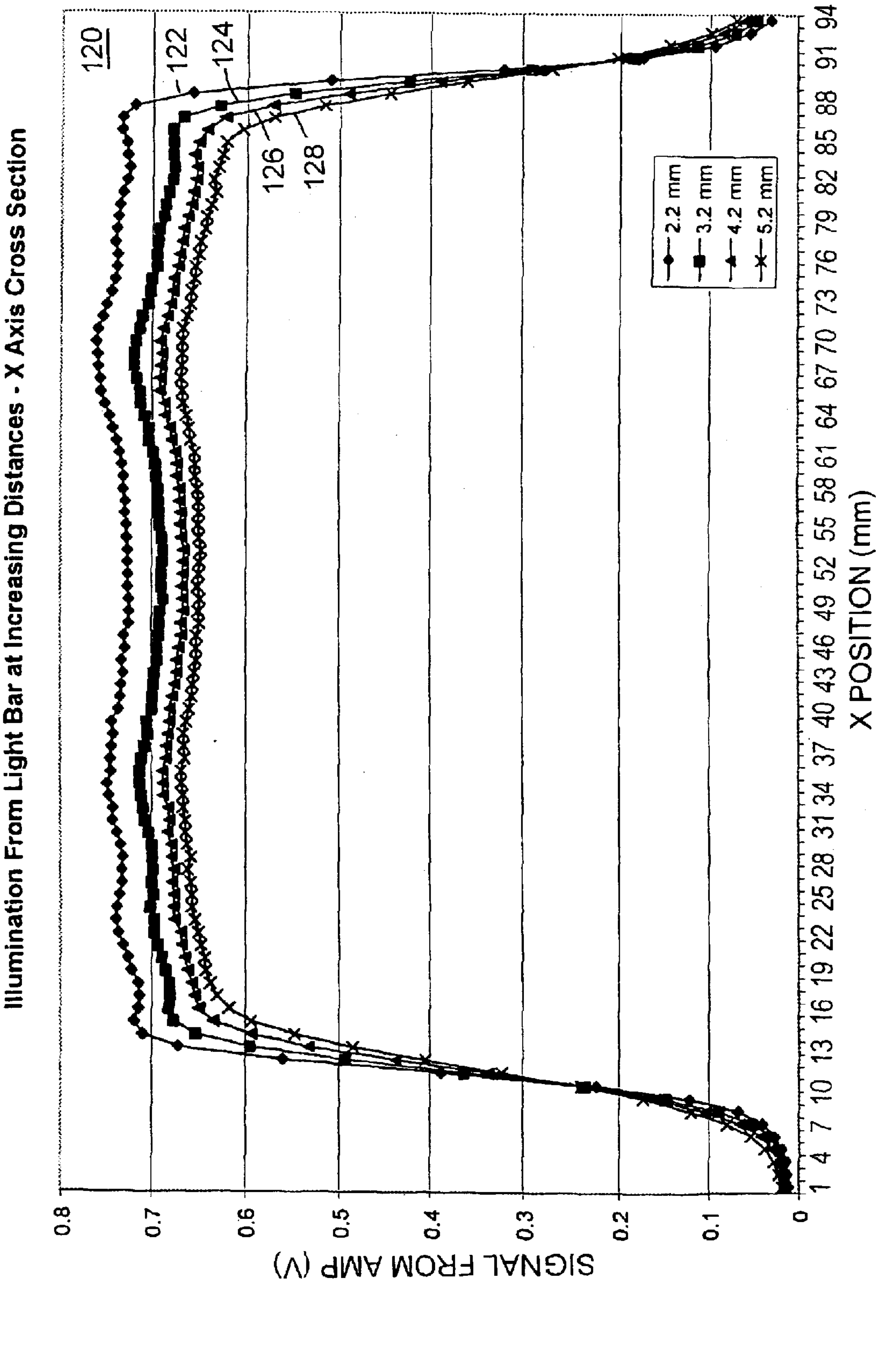

FIGS. 15 and 16 illustrate various distributions of the signal intensity of a light pipe core with a BEF film only at the document level, when the distance between the document and the light bar is varied from 2.2 mm to 5.2 mm in the allowed bill height range "h" in the bill passageway. FIGS. 15 and 16 show the situation, in the Y-direction 110 and the X-direction 120, respectively (the Y-direction is parallel to the edge of the short side "S" of the light pipe core, and the X-direction is parallel to the edge of the long side L of the light pipe core, as shown in FIG. 10). In particular, referring to FIG. 15, the illumination intensity plot 112 for a document only 2.2 mm away from the light bar 112 is higher than that for a document 3.2 mm away 114, and decreases for documents 4.2 mm away 116 and 5.2 mm away 118, respectively, from the light pipe core in the Y-axis. Similarly, in the X-Axis illumination intensity plots of FIG. 16, the light intensity is highest for a document that is 2.2 mm away 122 from the light bar, and decreases as shown by plots 124, 126 and 128 as documents are 3.2 mm, 4.2 mm and 5.2 mm away from the light bar, respectively. Such variations in light intensity are not acceptable for generating document validation signals, but may be suitable for other applications.

Figure 17:
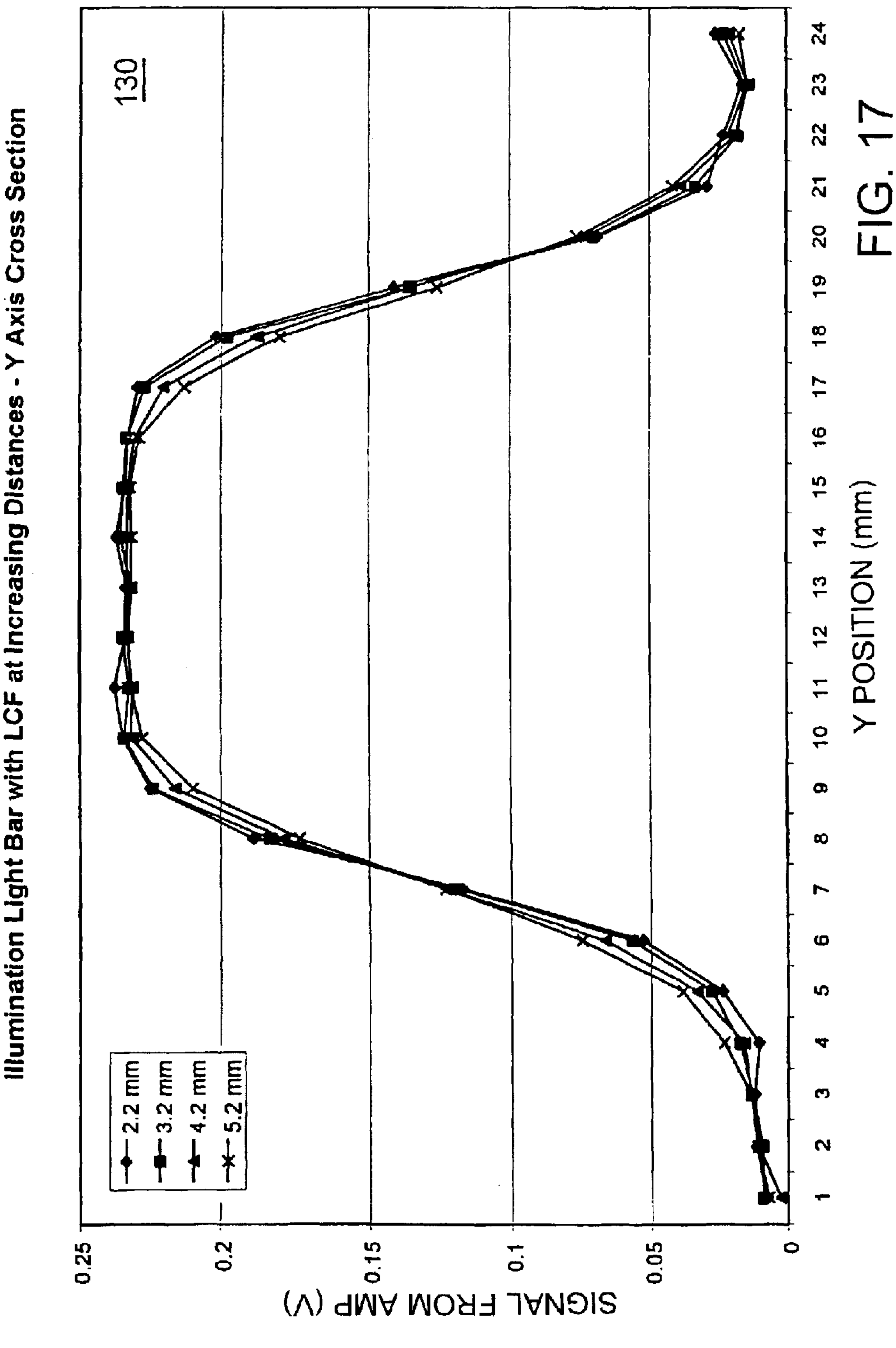
Figure 18:
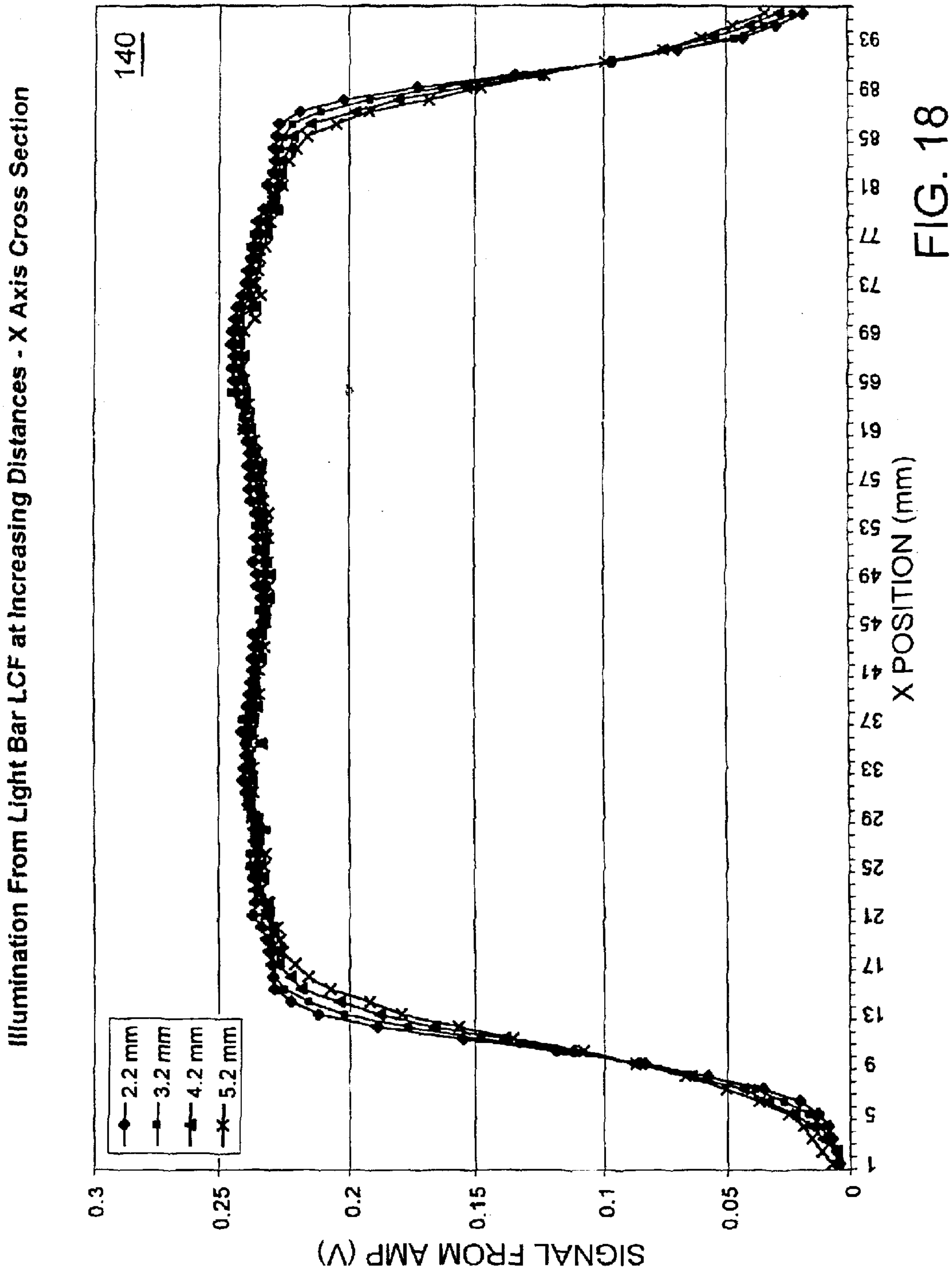

FIGS. 17 and 18 show the improved results in both the Y-axis 130 and X-axis 140 plots when the BEF and an LCF are used. The quasi-superimposition of the curves of FIGS. 17 and 18 for both the X and Y directions demonstrate the key contribution of the LCF film, which is that the signal is quasi-constant in the desired range of 2.2 mm to 5.2 mm that corresponds to the variation of document position from the light source. Put another way, the amplitude of the plots in FIGS. 17 and 18 for different height values (2.2 mm to 5.2 mm) of a document in the passageway are substantially the same, which is highly desirable for use in a document validator application.

Various implementations of a document validator subassembly have been described. However, it should be understood that one skilled in the art would understand that various additions and modifications could be made. For example, an alternate arrangement could include a second set of BEF and LCF films (or prism and louver layers) whose optical structure could be set at 90° from the first set to control the light distribution in the elongated direction of the light bar. The document validator subassembly may include a unitary light core that includes a light pipe, a diffusion structure layer, a prism layer and a louver layer, or a different combination of some of these layers. Other implementations are also contemplated that would improve the light output homogeneity, but may incur some light intensity loss. Such implementations may not be acceptable for some applications such as document validation, but may be acceptable for other devices that perform other functions. Such modifications and variations are within the scope of the following claims.

What is claimed is:

1. A subassembly for a document validator comprising:

a housing;

a light pipe core having a top diffusing surface, seated in the housing;

a light control layer associated with the top diffusing surface; and a plurality of light-emitting diodes (LEDs) coupled to the housing, wherein at least one LED differs in wavelength from another LED.

2. The apparatus of claim 1, wherein the light control layer is a light control film.

3. The apparatus of claim 1 further comprising a prism structure layer between the top diffusing surface and the light control layer.

4. The apparatus of claim 3 wherein the prism structure layer is a brightness enhancing film.

5. The apparatus of claim 1 wherein the diffusing surface comprises at least one of a random rough structure, a constant pitch pattern structure, and a variable pattern of protrusions.

6. The apparatus of claim 1 wherein the housing includes at least one input light port on at least one end of the light pipe core.

7. The apparatus of claim 1 wherein the housing includes a reflective interior surface.

8. The apparatus of claim 7 wherein the interior surface is diffusely reflective.

9. The apparatus of claim 1 including at least one light housing for the light-emitting diodes (LEDs).

10. The apparatus of claim 9 wherein the light housing is comprised of a reflective material.

11. The apparatus of claim 10 wherein the reflective material is diffusely reflective.

12. The apparatus of claim 10 further comprising a plurality of light housing for the LEDs.

13. The apparatus of claim 12 wherein two light housings for the LEDs are located at opposite ends of the light pipe core.

14. The apparatus of claim 1 wherein the housing comprises first and second reflective shells configured to surround the light pipe core.

15. A document sensing arrangement comprising:

a light source subassembly for positioning on a first side of a document passageway, the subassembly including a housing, a light pipe core seated in the housing and having a top diffusing surface, a light control layer associated with the top diffusing surface, and at least one light source coupled to the housing; and at least one light sensor for positioning on a second side of the document passageway across from the light source subassembly.

16. The apparatus of claim 15 wherein the light control layer is a light control film.

17. The apparatus of claim 15 further comprising a prism structure layer between the top diffusing surface and the light control layer.

18. The apparatus of claim 17 wherein the prism structure layer is a brightness enhancing film.

19. The apparatus of claim 15 wherein the diffusing surface comprises at least one of a random rough structure, a constant pitch pattern structure, and a variable pattern of protrusions.

20. The apparatus of claim 15 wherein the housing includes at least one input light port on at least one end of the light pipe core.

21. The apparatus of claim 15 wherein the housing includes a reflective interior surface.

22. The apparatus of claim 21 wherein the interior surface is diffusely reflective.

23. The apparatus of claim 15 wherein the light source comprises a light housing and at least one light-emitting diode (LED).

24. The apparatus of claim 23 wherein the light source comprises at least one additional light housing and LED.

25. The apparatus of claim 23 wherein the light housing is comprised of a reflective material.

26. The apparatus of claim 25 wherein the reflective material is diffusely reflective.

27. The apparatus of claim 15 wherein the housing comprises first and second reflective shells configured to surround the light pipe core.

28. A method for illuminating a document in a document passageway comprising:

providing a subassembly that includes a reflective housing, a light pipe core having a top diffusing surface, a light control layer and at least one light source; and illuminating the document with a substantially rectangular beam of substantially homogenous light.

29. The method of claim 28 further comprising utilizing a prism structure layer in the subassembly to increase the light intensity output.

30. The method of claim 28 further comprising generating signals indicative of document authenticity based on the light passing through a document.

31. The method of claim 28 further comprising generating signals indicative of document authenticity based on the light reflecting from a surface of a document.

32. A method of fabricating a light bar structure for a document validator subassembly comprising:

fabricating a light pipe core to provide a light output across a document passageway;

fabricating a diffusing structure onto an output side of the core; and applying a light control film to the diffusing structure.

33. The method of claim 32 further comprising connecting a reflective housing to the light pipe core.

34. The method of claim 33 further comprising coupling at least one LED light source package to the housing.

35. The method of claim 32 further comprising applying at least one layer of brightness enhancing film between the diffusing structure and the light control film.

36. A method of fabricating a light bar structure comprising:

fabricating a light pipe core to provide a light output across a document passageway;

fabricating a diffusing structure layer; and fabricating a louver structure layer onto an output side of the core.

37. The method of claim 36 further comprising connecting a reflective housing to the light bar structure.

38. The method of claim 37 further comprising coupling at least one LED light source package to the housing.

39. The method of claim 36 further comprising fabricating a prism structure layer below the louver structure layer.

* * * * *

UNITED STATES PATENT AND TRADEMARK OFFICE

CERTIFICATE OF CORRECTION

PATENT NO. : 6,994,203 B2
APPLICATION NO. : 10/211009
DATED : February 7, 2006
INVENTOR(S) : Edward M. Zoladz, Jr. et al.

It is certified that error appears in the above-identified patent and that said Letters Patent is hereby corrected as shown below:

Col. 10, Claim 12, line 36, “housing” should be --housings--.

Signed and Sealed this

Twenty-sixth Day of December, 2006

JON W. DUDAS
*Director of the United States Patent and Trademark Office*